Oct. 28, 1969  D. V. CHENOWETH  3,474,859
WELL FLOW CONTROL APPARATUS
Filed July 14, 1967  3 Sheets-Sheet 2

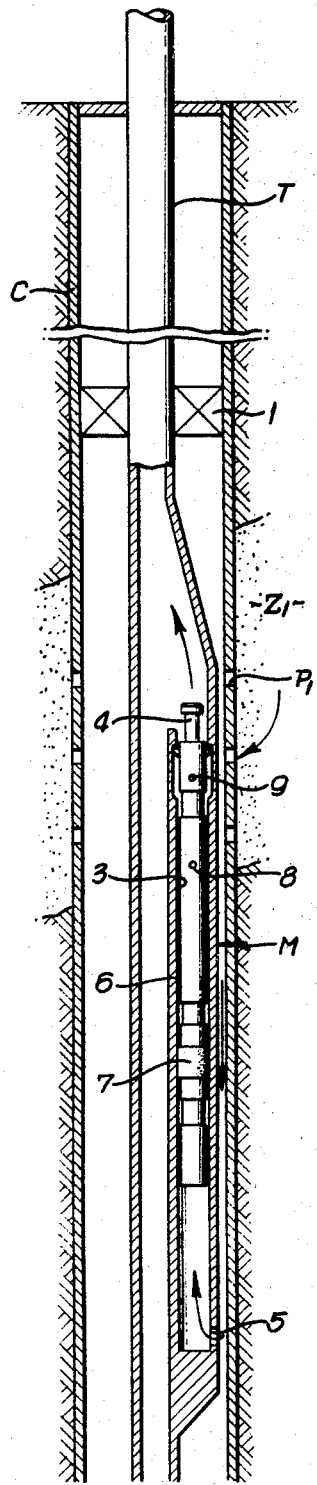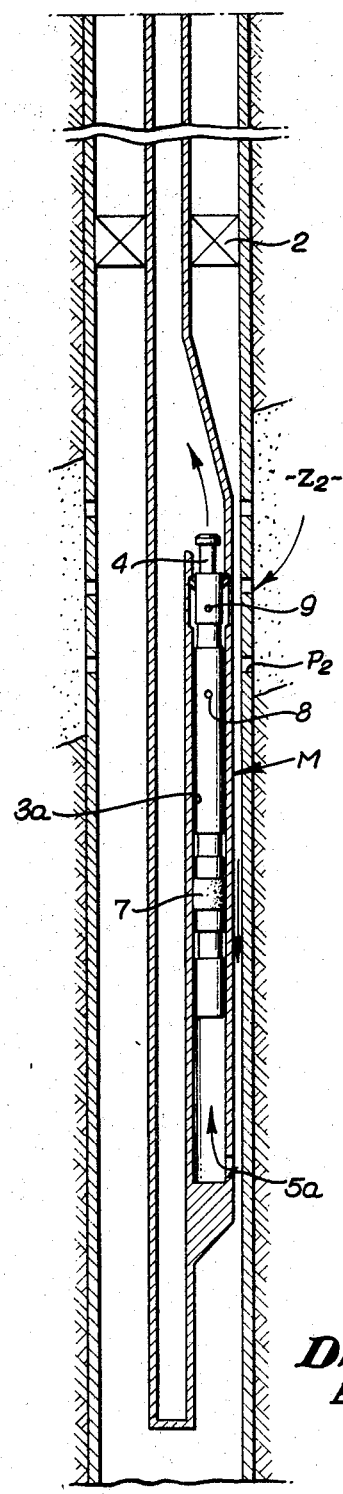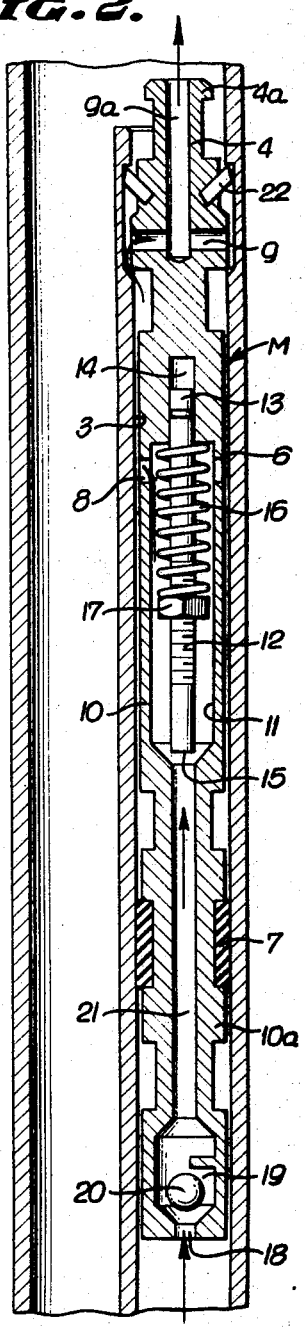

INVENTOR.
DAVID V. CHENOWETH
By Bernard Kriegel
ATTORNEY.

Oct. 28, 1969  D. V. CHENOWETH  3,474,859
WELL FLOW CONTROL APPARATUS
Filed July 14, 1967

INVENTOR.
DAVID V. CHENOWETH
By Bernard Kriegel
ATTORNEY.

United States Patent Office
3,474,859
Patented Oct. 28, 1969

3,474,859
WELL FLOW CONTROL APPARATUS
David V. Chenoweth, Houston, Tex., assignor to Baker Oil Tools, Inc., City of Commerce, Calif., a corporation of California
Filed July 14, 1967, Ser. No. 653,372
Int. Cl. E21b *33/12, 43/12*
U.S. Cl. 166—147        16 Claims

ABSTRACT OF THE DISCLOSURE

Well flow control apparatus in which a pressure responsive regulator maintains a constant back pressure on the formation to produce compressible well fluids from one or more subsurface well zones at a constant mass rate of flow.

---

The present invention relates to flow control apparatus, and more particularly to flow control apparatus useful in regulating the flow of a compressible fluid from a well production zone, or a plurality of such zones, to the earth's surface through production tubing.

It is the practice in the production of wells to control or regulate the rate of flow of production from one or more productive zones by orifice devices or orifice valves. These prior devices have been incapable of properly regulating the flow of a compressible fluid, such as a gaseous medium, under conditions of variable zone pressure, or both.

An object of the present invention is to provide apparatus for producing compressible well fluids, hereinafter generically referred to as well fluids, and including gas as well as liquid bearing gas, wherein a regulator device is installed in a tubing string for controlling the flow of production fluids from a selected well zone, the pressure device being so constructed that, as a function of a spring force, there will be maintained a constant formation back pressure so that the mass flow rate into the production tubing will be constant.

In accordance with another object of the invention, the well production tubing may be provided with a multiplicity of flow control devices which act to automatically maintain pressure on each of a multiplicity of formation zones at a constant value, as the production fluids from the respective zones are commingled in the production tubing string leading to the earth's surface, and regardless of variations in the tubing pressure downstream of the regulator devices. In the production of fluid from multiple zones traversed by the well bore, each of the zones may be individually controlled as to its production rate without regard to the production rate of the other zone or zones.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIGURES 1a and 1b are longitudinal sectional views schematically showing constant mass flow apparatus in accordance with the invention in tubing side pockets at multiple zones in a well bore, FIG. 1b being a downward continuation of FIG. 1a;

FIG. 2 is a longitudinal sectional view through one of the mass flow control assemblies of FIGS. 1a and 1b;

Figure 4A:
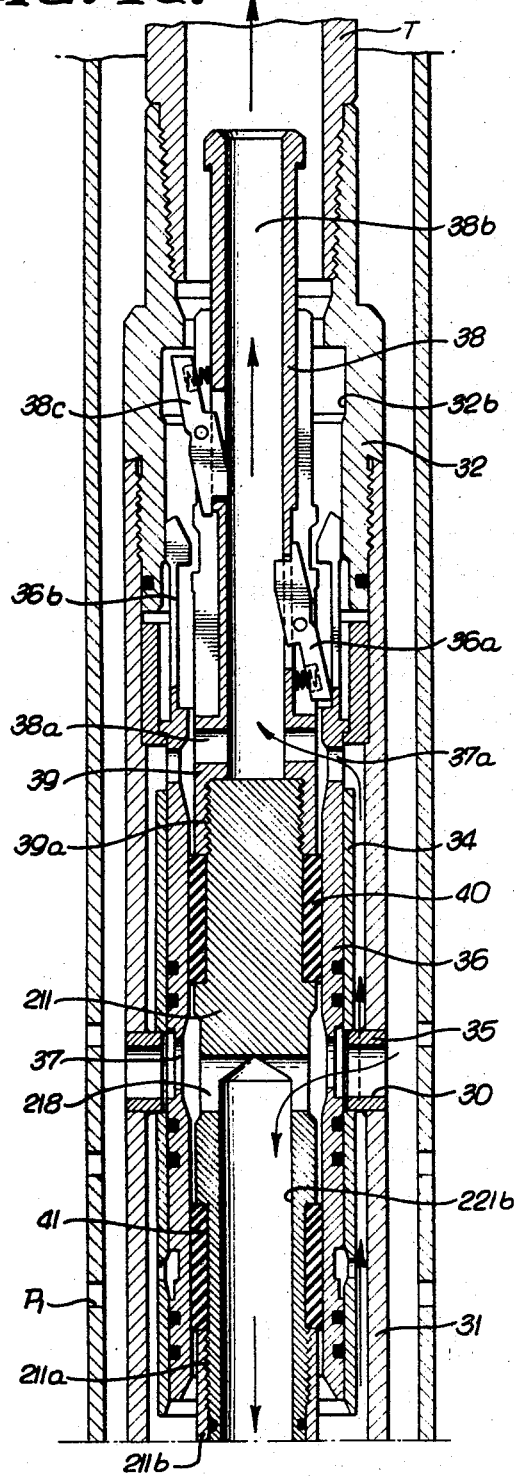
FIGS. 4a, 4b and 4c are longitudinal sectional views illustrating the specific details of constant mass flow apparatus as generally taken on the plane of the line 4—4 of FIG. 3, and as representative of such apparatus at each zone, FIG. 4b being a downward continuation of FIG. 4a and FIG. 4c being a downward continuation of FIG. 4b.

Referring to FIGS. 1a and 1b, mass flow apparatus is illustrated as installed in a well production tubing T leading from a plurality of production well zones to the top of the well bore, which well bore has had well casing C set therein, the casing having been provided with perforations P1 in an upper productive well zone Z1, and with perforations P2 in the region of a lower productive well zone Z2. An upper well packer 1 of any known type is set in the well bore and forms a seal with the tubing T and with the casing C above the zone Z1. A second similar packer 2 is set in the well in sealing engagement with the tubing T and the casing C between the zone Z1 and the zone Z2 so as to isolate the zones from one another. It will be understood that, if desired, still another such packer or packers may be set below the zone Z2 to isolate it from a lower zone or zones and such lower zones from one another.

In the production of fluids from multiple well zones, as illustrated in FIGS. 1a and 1b, it is often desirable that the fluid be conducted to the surface of the earth through a single production pipe or tubing T with the fluids from the zones commingled. It is, nevertheless, desirable and sometimes necessary to produce each of the zones at a known mass rate of flow. Therefore, the present invention provides simple means for maintaining a constant mass rate of flow from each of the zones, regardless of the rate of flow of fluids from the other zone, and regardless of variations in the pressure in the tubing either between the zones or above the upper zone Z1.

In the tubing T, as seen in FIG. 1a, there is provided in the region of zone Z1 a side pocket 3 in which, in a well known manner, mass flow control apparatus, generally designated M, may be installed by running the same into the well through the tubing T on a wireline tool (not shown) releasably connected to a running and recovery head 4 at the upper end of the flow control apparatus M. A second side pocket 3a is provided in the tubing string T in the region of the productive zone Z2 and in this side pocket 3a is another mass flow apparatus M.

Production fluid from the zone Z1, as indicated by the arrow, may flow through the perforations P1 into the space defined between the tubing T and the casing C between the packers 1 and 2 and will find access to the side pocket 3 through suitable ports 5 upstream of the apparatus M. Such production fluid will enter the lower end of the apparatus M and emerge therefrom through ports 8 into an annular clearance space 6 defined between the inside wall of the side pocket 3 and the apparatus M above a packing ring or seal 7 carried by the latter and sealingly engaged in the side pocket 3. From the space 6 the fluid will enter inlet ports 9 in the running and recovery head 4, and from the head the fluid will, as shown by the arrows, pass into the tubing T for flow to the earth's surface. Similarly, production fluid from the zone Z2 may enter the ports 5a in the side pocket 3a and flow into the tubing T in the same manner as just described in relation to FIG. 1a, the fluids produced from the respective zones comingling in the tubing string above the uppermost flow control apparatus M.

In FIG. 2, there is diagrammatically illustrated an apparatus M installed in the side pocket 3, as previously referred to, this apparatus M being illustrative of that which also may be installed in the side pocket 3a. The apparatus M includes generally an elongate body 10 having a chamber or bore 11 therein, there being a stem 12 reciprocably disposed in the bore 11 and having one of its ends 13 sealingly and reciprocably disposed in a chamber 14, which, for a purpose which will hereinafter be more fully apparent, is at atmospheric pressure. At the other end of the stem 12 is an end face 15 which is the same in cross-sectional area as the area of the stem portion 13 in the chamber 14, the remainder of the stem being pressure balanced in the sense that it has no surfaces exposed to pressure whereby a force will be imposed on the stem 12 to move the same in any direction, other than the force created by the application of pressure to the end face 15. The force derived from the application of pressure to the end face 15 is opposed only by spring force provided by a spring 16 disposed in the chamber 11 and abutting at one end at the upper end of the chamber and at its other end against an adjustable nut 17 threadedly disposed on the stem so as to enable adjustment of the working force of the spring 16.

As indicated by the arrows in FIG. 2, the production fluid flow through the side pocket 3 is into an inlet port 18 at the lower end of the flow control apparatus M and into a backflow preventing check valve chamber 19 having a ball valve 20 therein, which may be employed, if desired, to prevent backflow through the apparatus. The body 10 of the apparatus M includes a depending section 10a below the body 10 and having a flow passage 21 therethrough leading into the chamber 11. It will be noted that the effective diameter of the stem 12 opposing the passageway 21 is substantially identical to the diameter of the passage so that the end of the stem 12 constitutes throttle valve means adapted to regulate the permitted flow from the passage 21 into the chamber 11.

It will be noted that inasmuch as the end 15 of stem 12 is responsive to pressure in the passage 21 to provide a force opposed by the spring 16, the position and, therefore, the permitted rate of flow through the mass flow control apparatus M will be solely a function of the preestablished spring force provided by the spring 16. The fact that the upper end 13 of the stem 12 is disposed in an atmospheric chamber, for practical purposes, will negative any pressure effect counter to the effect of pressure acting on the end face 15 of the stem 12. Such an assembly provides a facility for installing the mass flow control apparatus M in a position in the tubing string for controlling the flow of production fluid from one of the zones Z1 or Z2 at a constant mass rate inasmuch as the pressure upstream of the valve face 15 will be maintained at a constant value which will establish the back pressure on the formation.

The mass flow control apparatus described above may essentially be characterized as an upstream pressure regulator, inasmuch as it maintains a constant upstream pressure and it corresponds generally to the upstream pressure regulator disclosed and claimed in my application for Letters Patent filed concurrently herewith, Ser. No. 653,554.

The apparatus M, as previously indicated, may be run into the side pocket 3, or into the side pocket 3a, on the running and recovery head 4 by means of a wireline setting tool so that the apparatus M will be latched in the side pocket by means of releasable latch elements 22, in a manner well known in the art. The ports 9 previously referred to in the head 4 communicate with an axially extended passage 9a leading into the tubing above the head 4. The head, as is customary, has an outstanding flange 4a engageable by the running and recovery tool.

Figure 3:
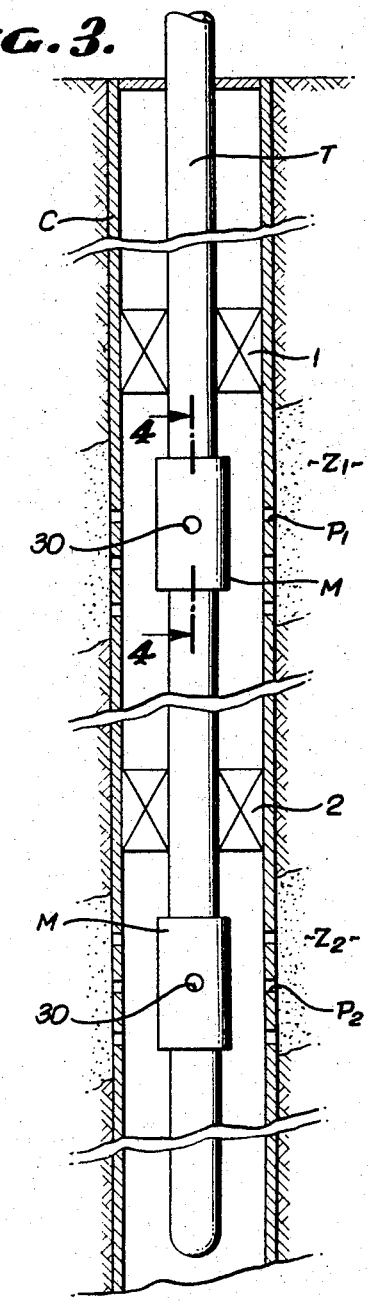
FIG. 3 is a view in longitudinal section schematically illustrating an installation of well flow control apparatus at multiple zones in a concentric tubing-casing installation.

Referring now to FIG. 3, the present invention is illustrated as embodied in a concentric tubing-casing installation, wherein the tubing T is concentrically disposed within the casing C and extends through the well zones Z1 and Z2, the casing also being perforated at P1 and P2 to allow well production fluid to flow from the zone Z1 into the annular space between the tubing and casing and between the well packers 1 and 2; while production fluid from zone Z2 will flow through the perforations P2 into the casing C below the well packer 2, these packers, as previously indicated, forming a seal with the tubing T and isolating the zones from one another.

In this embodiment of the invention, the fluid will pass into the mass flow control apparatus M in the respective isolated regions of the casing through inlet ports 30, and, in a manner which will now be described, such fluid will pass upwardly into the tubing string T, the fluid from the respective zones being comingled in the tubing.

Figure 4B:
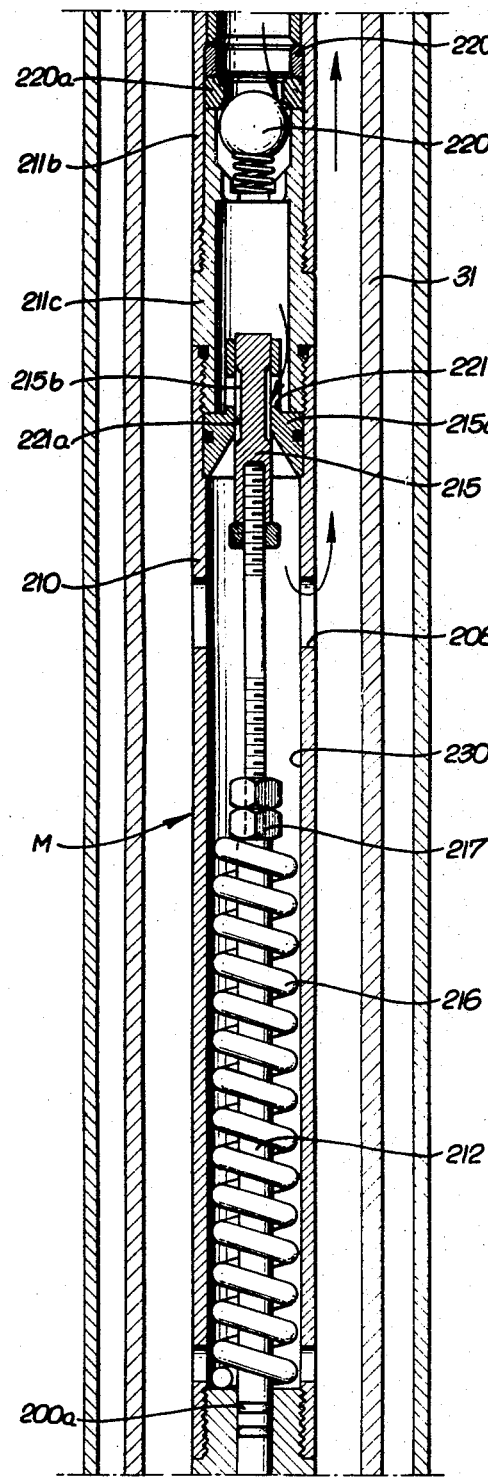
Figure 4C:
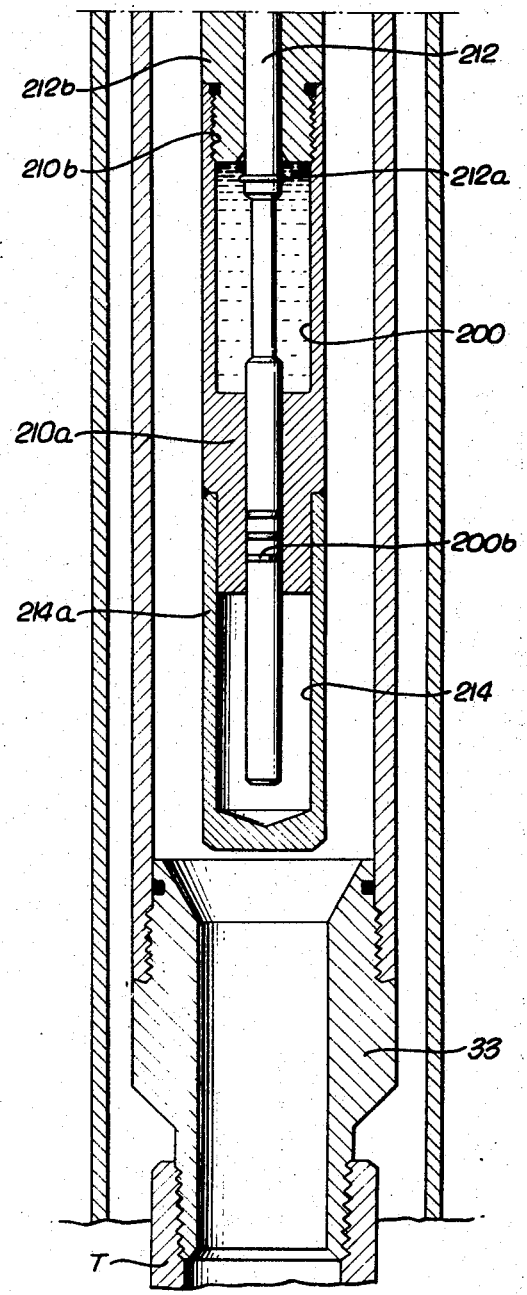

FIGS. 4a to 4c show in detail a representative mass flow apparatus in the concentric tubing-casing installation, such as that generally illustrated in FIG. 3. As seen in FIGS. 4a to 4c, the assembly comprises a housing composed of an elongate body 31 having an upper sub 32 threadedly connected to the tubing T at its upper end. At the lower end of the body 31 is a bottom sub 33 connected to a downward extension of the production tubing T, and which will be understood to extend downwardly through the packer 2 shown in FIG. 3 for connection to a similar assembly for controlling the production from the lower zone Z2.

Interiorly of the housing 31 is a fixed sleeve 34 secured in spaced relation to the housing by a plurality of nipples 35 providing the fluid inlets 30 from the well casing, these nipples being welded, or otherwise secured, to the housing 31 and to the sleeve 34. If desired, a sleeve valve 36 may be provided for selectively opening and closing the ports 30, this sleeve valve being reciprocably disposed within the fixed sleeve 34 and having valve ports 37 adapted, when the sleeve valve 36 is in a lower position, to register with the ports 30 in nipples 35. The sleeve 36 has an upper set of ports 37a adapted to be disposed above the upper end of the fixed sleeve 34 when the sleeve 36 is in said upper position. This sleeve valve structure is optional, forms no part of the present invention, and is more particularly shown and described in application Ser. No. 488,943, filed Sept. 21, 1965, now Patent No. 3,371,717. In the illustrative embodiment, however, the sleeve valve forms a part of the running and recovery assembly, including a recovery head having a body 38 adapted to be engaged by a suitable wireline running and recovery tool, as more particularly disclosed in the aforementioned application. The recovery head body 38 has lateral ports 38a communicating with ports 37a in the valve sleeve 36 when the latter is in the lower position, as shown in FIG. 4a. These ports 38a lead into an axially extended passage 38b in the head which opens into the production tubing or conduit T. The running and recovery head also includes suitable latch mechanism 38c for holding the assembly, including the mass flow apparatus M hereinafter described, within the housing 31.

Valve sleeve 36 is adapted to be shifted by latch elements 36a to its lower position with the ports 38a communicating with the inlets 30, and when the valve is moved to an upper position, spring-like latch elements 36b are adapted to engage in an enlarged bore or groove 32b in the upper sub 32 to hold the valve sleeve 36 in an upper position (not shown) at which the inlets 30 will be closed.

Also included in the recovery head is a lower body portion 39 which supports, by a threaded connection 39a, the body 211 of the upstream pressure regulator. This body includes an upper section threadedly connected to the body of the running and recovery head and extended downwardly in sealed relation to the valve sleeve 36, there being sealing means or packings 40, 41 disposed about the body 211 and in sealing engagement with the inside of the valve sleeve 36. Between these packings 40, 41, the body 211 of the upstream pressure regulator is provided with the inlet ports 218. The body section 211 is threadedly connected at 211a to a downwardly extended section 211b, to the lower end of which a coupling 211c is threadedly connected. In the coupling 211c is a backflow preventing ball valve 220 engageable with a seat 220a held in place by a ring 220b which engages the lower end of the body section 211.

It will be noted that the body sections 211 and 211b, together with the coupling 211c, constitute an axially extended portion of the pressure regulator body 210, to which the coupling 211c is threadedly connected, as seen in FIG. 4b. At the lower end of the body 210 is an end piece 210a threadedly connected and sealed in relation to the body 210 at 210b, as shown in FIG. 4c, the end piece having a chamber 214 therein provided with an end cap 214a which is suitably welded to, or otherwise formed as, a part of the end piece 210a.

Reciprocably disposed within the body 210 is a stem 212 having thereon adjustable nuts 217 forming an upper abutment for a coil spring 216. At its lower end, as seen in FIG. 4c, the stem 212 extends in sealed relation into the chamber 214 and is limited in respect of its upward movement by a snap ring 212a mounted thereon and engageable with the lower end of a guide 212b to which the end piece 210a is attached, the stem 212 extending through the guide into the chamber 230 within the body 210. It will be noted that the stem 212, as seen in FIG. 4c, extends through a chamber 200 which contains a quantity of lubricant, such as silicon oil, whereby the stem section extending through the body sections 212b, 210a will be lubricated to reduce friction effects. The lubricant is confined by suitable sealing means at 200a between the stem and body, and by the sealing means 200b which seals the lower end of the stem 212 in the atmospheric chamber 214.

The upper extremity of the stem 212 is provided with a throttle valve member 215 which is slidably disposed within a valve guide 215a, the latter having inlet ports 221 leading to a bore 221a through the guide 215a. The throttle valve member 215 has a reduced section 215b which, when the valve is in the open position, as shown in FIG. 4b, permits controlled flow through the passage 221a of the valve guide 215a.

It will now be understood that in all substantial functional respects, the pressure regulating valve construction illustrated in FIGS. 4a to 4c is the same as that described in respect to FIG. 2. In other words, the throttle valve end 215 of the stem 212 will assume a position at which flow through inlet 221, 221a is controlled as a function of the pressure acting on the cross-sectional area of the valve member 215 to provide a force counteracted by the force of the spring 216, the remainder of the stem being, as previously indicated, pressure balanced.

In the illustrative embodiment of FIGS. 4a to 4c, assuming the ports 30 and 37 to be open, as shown in FIG. 4a, production fluid from the well zone in which the apparatus is disposed may pass through these ports and flow downwardly through a central passageway 221b in the regulator body section 211 past the check valve 220. The fluid will then proceed downwardly through the inlet ports 221 in the valve guide 215a, and through passage 221a into the chamber 230, from whence it may flow through ports 208 into the annular space defined between the housing 31 and the flow regulating apparatus M, as shown in FIG. 4b. Then, as shown in FIG. 4a, the fluid will continue to pass upwardly through the ports 37a in the valve sleeve 36 and through the ports 38a in the recovery head body 38 so as to flow upwardly through the passage 38b in the latter. The rate at which the production fluid may flow through the throttle valve guide 215a will be determined by the force supplied by spring 216 tending to close off the flow and acting against the force provided by the pressure of the production fluid acting on the cross-sectional area of the throttle valve member 215, so that there will be maintained a constant back pressure on the formation and, therefore, a constant mass rate of production fluid flow into the tubing T. The constant pressure on the formation will be maintained notwithstanding the use of auxiliary lift equipment in the tubing T above the mass rate flow control means, such as gas lift apparatus or the usual pumping apparatus, all well known in the art.

I claim:

1. In apparatus for conducting compressible well production fluid from a producing well zone to the top of a well bore at a constant mass rate of flow regardless of variations in pressure in the tubing string: a tubing string in the well bore, packing means set in the well bore in sealed relation to said tubing string to confine the production fluid to a flow path through said tubing string, and regulator means interposed in the path of fluid flow from said zone into said tubing for automatically maintaining a constant back pressure on said zone regardless of variations in the pressure of fluid in said tubing, said regulator means being operative to open more fully upon tendency of the fluid pressure at said zone to increase and to close more fully upon tendency of the fluid pressure at said zone to decrease, whereby to maintain the pressure at said zone constant.

2. Apparatus as defined in claim 1, wherein said regulator means comprises an upstream pressure regulator to open more fully upon tendency of the formation fluid pressure to increase and to close more fully upon tendency of the formation fluid pressure to decrease, whereby to maintain said formation fluid pressure constant.

3. Apparatus as defined in claim 1, wherein said pressure regulator means includes throttle valve means responsive to the pressure of fluid in said formation to open more fully upon tendency of the formation fluid pressure to increase and to close more fully upon tendency of the formation fluid pressure to decrease, whereby to maintain said formation fluid pressure constant.

4. Apparatus as defined in claim 1, including backflow preventing valve means interposed in the path of fluid flow into said tubing string.

5. Apparatus as defined in claim 1, wherein said tubing string includes a side pocket, said regulator means being disposed in said side pocket, and including running and recovery means releasably securing said regulator means in said side pocket.

6. Apparatus as defined in claim 1, wherein said tubing string includes a housing concentrically disposed in said well bore, said regulator means being disposed in said housing, and including running and recovery means releasably securing said regulator means in said housing.

7. In apparatus for conducting compressible well production fluid from a producing well zone to the top of a well bore at a constant mass rate of flow regardless of variations in pressure in the tubing string: a tubing string in the well bore, packing means set in the well bore in sealed relation to said tubing string to confine the production fluid to a flow path through said tubing string, and regulator means interposed in the path of fluid flow from said zone into said tubing for automatically maintaining a constant back pressure on said zone regardless of variations in the pressure of fluid in said tubing, wherein said regulator means comprises a body having an inlet passage and an outlet passage, throttle valve means including a stem disposed in said body, one end of said stem having a surface adjacent one of said passages and responsive to fluid pressure for urging said stem in one direction, said body having a chamber at atmospheric pressure in which the other end of said stem is sealingly and reciprocably disposed, and a spring in said body acting on said stem for urging said stem in the other direction.

8. Apparatus as defined in claim 7; said surface of said one end of said stem being adjacent said inlet passage and responsive to upstream fluid pressure.

9. In apparatus for conducting compressible well production fluids from a plurality of producing zones to the top of a well bore: a tubing string in the well bore, packing means set in the well bore in sealing relation to said tubing string to isolate the production fluid from the respective zones, flow control means in the tubing string for the respective zones, each of said flow control means including regulator means for maintaining a constant back pressure on the respective zone regardless of changes in the pressure of fluid in said tubing string, each of said regulator means being operative to open more fully upon tendency of the fluid pressure at its associated zone to increase and to close more fully upon tendency of the fluid pressure at said associated zone to decrease, whereby to maintain the pressure at said associated zone constant.

10. Apparatus as defined in claim 9, wherein said flow control means and said tubing string include means for releasably supporting said flow control means in said tubing string.

11. Apparatus as defined in claim 9, wherein said tubing string is provided with a side pocket for each of said zones, and said regulator means being disposed in the side pocket of each zone.

12. In apparatus for conducting compressible well production fluids from a plurality of producing zones to the top of a well bore: a tubing string in the well bore, packing means set in the well bore in sealing relation to said tubing string to isolate the production fluid from the respective zones, flow control means in the tubing string fort he respective zones, each of said flow control means including regulator means for maintaining a constant back pressure on the respective zone regardless of changes in the pressure of fluid in said tubing string, wherein said flow control means at each zone includes an elongate housing connected at its ends in said tubing string to form a part thereof, means in said housing for each zone providing a production fluid inlet into said housing and an outlet leading from said housing into the tubing string, and said regulator means interposed in said housing between said inlet and said outlet of said housing at each zone.

13. Apparatus as defined in claim 9; each of said regulator means being pressure balanced as to pressure in said tubing string, whereby pressure in said tubing string has no affect on said regulator means.

14. Apparatus as defined in claim 9, wherein said regulator means includes throttle valve means responsive to the pressure of fluid at the respective zone to open more fully upon tendency of the formation fluid pressure to increase and to close more fully upon tendency of the formation fluid pressure to decrease, whereby to maintain said formation fluid pressure constant.

15. In apparatus for conducting compressible well production fluids from a plurality of producing zones to the top of a well bore: a tubing string in the well bore, packing means set in the well bore in sealing relation to said tubing string to isolate the production fluid from the respective zones, flow control means in the tubing string for the respective zones, each of said flow control means including regulator means for maintaining a constant back pressure on the respective zone regardless of changes in the pressure of fluid in said tubing string, wherein each of said regulator means comprises a body having an inlet passage and an outlet passage, throttle valve means including a stem disposed in said body, one end of said stem having a surface adjacent one of said passages and responsive to fluid pressure for urging said stem in one direction, said body having a chamber at atmospheric pressure in which the other end of said stem is sealingly and reciprocably disposed, and a spring in said body acting on said stem for urging said stem in the other direction.

16. In apparatus for conducting compressible well production fluid from a producing well zone to the top of a well bore at a constant mass rate of flow regardless of variations in pressure in the tubing string: a tubing string in the well bore, packing means set in the well bore in sealed relation to said tubing string to confine the production fluid to a flow path through said tubing string, and regulator means interposed in the path of fluid flow from said zone into said tubing for automatically maintaining a constant back pressure on said zone regardless of variations in the pressure of fluid in said tubing, said regulator means being pressure balanced as to pressure in said tubing string, whereby pressure in said tubing string has no affect on said regulator means.

References Cited

UNITED STATES PATENTS

| | | | |
|---|---|---|---|
| 2,839,144 | 6/1958 | Ault | 166—224 X |
| 2,870,843 | 1/1959 | Rodgers | 166—115 |
| 2,994,335 | 8/1961 | Dudley. | |
| 3,045,759 | 7/1962 | Garrett et al. | 166—24 |
| 3,282,341 | 11/1966 | Hodges | 166—224 |
| 3,371,717 | 3/1968 | Chenoweth | 166—224 |

DAVID H. BROWN, Primary Examiner

U.S. Cl. X.R.

166—115, 224